(12) United States Patent
Mears et al.

(10) Patent No.: US 7,983,529 B2
(45) Date of Patent: Jul. 19, 2011

(54) METHOD AND APPARATUS FOR INDICATING WHETHER SUFFICIENT SPACE EXISTS FOR RECORDING A PROGRAM

(75) Inventors: Mark Gilmore Mears, Zionsville, IN (US); Eric Stephen Carlsgaard, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1568 days.

(21) Appl. No.: 10/555,150

(22) PCT Filed: May 4, 2004

(86) PCT No.: PCT/US2004/013832
§ 371 (c)(1),
(2), (4) Date: Nov. 2, 2005

(87) PCT Pub. No.: WO2004/100539
PCT Pub. Date: Nov. 18, 2004

(65) Prior Publication Data
US 2006/0263040 A1   Nov. 23, 2006

Related U.S. Application Data

(60) Provisional application No. 60/467,931, filed on May 5, 2003.

(51) Int. Cl.
*H04N 5/93* (2006.01)
*H04N 5/84* (2006.01)
*H04N 5/76* (2006.01)
*H04N 5/89* (2006.01)
*H04N 5/928* (2006.01)

(52) U.S. Cl. ........ 386/284; 386/335; 386/294; 386/295; 386/297; 386/238; 386/336; 386/339; 348/553; 348/441; 348/445; 348/446; 725/39; 725/47; 725/58

(58) Field of Classification Search ............ 386/83, 386/35, 46, 96, 109, 112, 123–124, 131, 386/284, 335, 294, 295, 297, 336, 238, 359; 725/39, 47, 58; 348/553, 441, 445, 446, 348/439.1
See application file for complete search history.

(56) References Cited

U.S. PATENT DOCUMENTS
5,900,915 A * 5/1999 Morrison .................. 725/44
(Continued)

FOREIGN PATENT DOCUMENTS
EP   1 107 588 A   6/2001
(Continued)

OTHER PUBLICATIONS
International Search Report.

*Primary Examiner* — Helen Shibru
(74) *Attorney, Agent, or Firm* — Robert D. Shedd; Vincent E. Duffy; Joel M. Fogelson

(57) ABSTRACT

There is provided a method for indicating whether a program is capable of being fully recorded in a remaining storage space on a storage device. An on screen display device is configured as a grid having a first axis and a second axis. The first axis is for identifying the programming selections and the second axis is for identifying the respective broadcast times of the programming selections. Any of the programming selections currently capable of being fully recorded in the remaining storage space on the storage device are identified on the grid using a first distinctive visual identifier. Any of the programming selections that are currently incapable of being fully recorded in the remaining storage space on the storage device are identified on the grid using a second distinctive visual identifier.

5 Claims, 3 Drawing Sheets

U.S. PATENT DOCUMENTS

| | | |
|---|---|---|
| 6,700,624 B2 * | 3/2004 | Yun ............................ 348/555 |
| 6,845,214 B1 | 1/2005 | Funaya et al. |
| 7,516,467 B1 * | 4/2009 | Arai et al. ...................... 725/39 |
| 7,660,514 B2 * | 2/2010 | Inoue et al. ................... 386/238 |
| 2002/0054750 A1 | 5/2002 | Ficco et al. |
| 2002/0126999 A1 * | 9/2002 | Shimamoto et al. ............ 386/96 |
| 2003/0031456 A1 | 2/2003 | Vogel |
| 2003/0033601 A1 * | 2/2003 | Sakata et al. .................... 725/29 |
| 2003/0107676 A1 * | 6/2003 | Jang ............................ 348/555 |
| 2003/0154478 A1 * | 8/2003 | Hassell et al. ................... 725/39 |
| 2003/0189571 A1 * | 10/2003 | MacInnis et al. .............. 345/505 |
| 2003/0222972 A1 * | 12/2003 | Hodac ........................ 348/14.01 |
| 2004/0015992 A1 * | 1/2004 | Hasegawa et al. .............. 725/86 |
| 2004/0213542 A1 * | 10/2004 | Hamasaka et al. ............. 386/46 |
| 2007/0199022 A1 * | 8/2007 | Moshiri et al. ................... 725/39 |
| 2009/0279871 A1 * | 11/2009 | Takahashi et al. ............ 386/112 |

FOREIGN PATENT DOCUMENTS

| | | |
|---|---|---|
| JP | 5-336484 A | 12/1993 |
| JP | 11-136646 A | 5/1999 |
| JP | 2000-21136 A | 1/2000 |
| JP | 2001-28731 A | 1/2001 |
| JP | 2001-77771 A | 3/2001 |
| JP | 2001-339696 A | 12/2001 |

* cited by examiner

METHOD AND APPARATUS FOR INDICATING WHETHER SUFFICIENT SPACE EXISTS FOR RECORDING A PROGRAM

This application claims the benefit, under 35 U.S.C. §365 of International Application PCT/US04/13832 filed May 5, 2004 which was published in accordance with PCT Article 21(2) on Nov. 18, 2004 in English and which claims the benefit of U.S. provisional patent application No. 60/467,931 filed May 5, 2003.

FIELD OF THE INVENTION

The present invention generally relates to storage devices and, more particularly, to providing an indication of whether sufficient space remains on a storage device to fully record a particular program thereon.

BACKGROUND OF THE INVENTION

IEEE 1394 (hereinafter 1394), also known as FIREWIRE or i-Link, is a high-speed connection capable of copy protection, transmitting audio and video over a single cable (and power too, in some cases), and transmitting network commands. With two 1394 connectors on the back of a device, 1394 devices can be connected in either a hub or device-to-device configuration to create a network of 1394 devices.

Some display devices such as, for example, a high definition television (HDTV) as the RCA DM2CR has two 1394 connectors that are bi-directional for communications. That is, these connectors are capable of both inputting media to the HDTV (from an external source) and outputting media from the HDTV (to an external device such as a storage device). The benefit to an HDTV outputting audio and video via 1394 is that a digital television program received and tuned by the HDTV can be output via to a digital recorder and recorded. Examples of digital recorders to which the present invention may be applied include, but are not limited to, a storage device such as an Audio Video Hard Disk Drive (AVHDD), a Digital Video Cassette Recorder (DVCR), and so forth. Other interface mechanisms (such as, for example, Home Appliance Virtual Interface (HAVI)) may be used to accomplish the above-described feature.

Since the DM2CR HDTV can output video via 1394, an AVHDD (Audio Video Hard Disk Drive) would make an ideal companion accessory to the DM2CR HDTV. The TV remote can be used to operate the AVHDD (e.g., Play, Record, Stop, and so forth) since the AVHDD does not have its own remote nor its own On-Screen Display (OSD).

However, in the preceding arrangement involving a HDTV and an AVHDD, the problem exists in how to give a user an awareness of the remaining space on the AVHDD so that the user can know whether sufficient space exists on the hard drive to record a particular program. A further problem exists when information cannot be extracted from the AVHDD during recording nor displayed during recording because the storage device is incapable of generating a video signal to display such information. Accordingly, a user may begin recording a program only to ascertain during that recording that insufficient space exists on the AVHDD to record the program in its entirety.

Accordingly, it would be desirable and highly advantageous to have a method for providing a user with an indication of whether sufficient space remains to fully record a program on an AVHDD that does not have its own On-Screen Display (OSD).

SUMMARY OF THE INVENTION

According to an aspect of the present invention, there is provided a method for indicating whether a program is capable of being fully recorded in a remaining storage space on a storage device such as an Audio Video Hard Disk Drive (AVHDD) and that is coupled to a display device. An on screen display (OSD) device is configured to generate a grid having a first axis and a second axis. The first axis is for identifying the programming selections and the second axis is for identifying the respective broadcast times of the programming selections. Any of the programming selections currently capable of being fully recorded in the remaining storage space on the AVHDD are identified on the grid using a first distinctive visual identifier. Any of the programming selections that are currently incapable of being fully recorded in the remaining storage space on the AVHDD are identified on the grid using a second distinctive visual identifier.

According to another aspect of the present invention, there is provided a method for indicating whether a program is capable of being fully recorded in a remaining storage space on an Audio Video Hard Disk Drive (AVHDD) that is without an On-Screen Display (OSD) and that is coupled to a High Definition Television (HDTV) that has an OSD. The OSD of the HDTV is configured as a grid having a first axis and a second axis. The first axis is for identifying the programming selections and the second axis is for identifying the respective broadcast times of the programming selections. Any of the programming selections that are to be broadcast in both high definition and standard definition but are currently only capable of being recorded in the remaining storage space on the AVHDD in the standard definition are identified on the grid using a distinct visual identifier to indicate such capability.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to methods for providing an indication of whether sufficient space remains on a storage device to fully record a particular program thereon. Moreover, the present invention automatically allows a user to "make room" for the particular program, when the program is currently incapable of being recording in the remaining space of the storage device, such as an AVHDD. This may involve, for example, deleting one or more existing television programs and/or down sampling a program that is to broadcast in high definition to standard definition. It is to be appreciated that the terms "program" and "programming selection" are used interchangeably herein.

For purposes of this specification, the term storage device refers to any apparatus or device capable of storing audio and/or video information. Such storage devices are hard drives, floppy discs, DVDs, compact discs, video tape recorders, flashcards, and other medium capable of storing video and/or audio information. Display devices are device capable of displaying video information such as televisions, monitors, screens, and the like.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
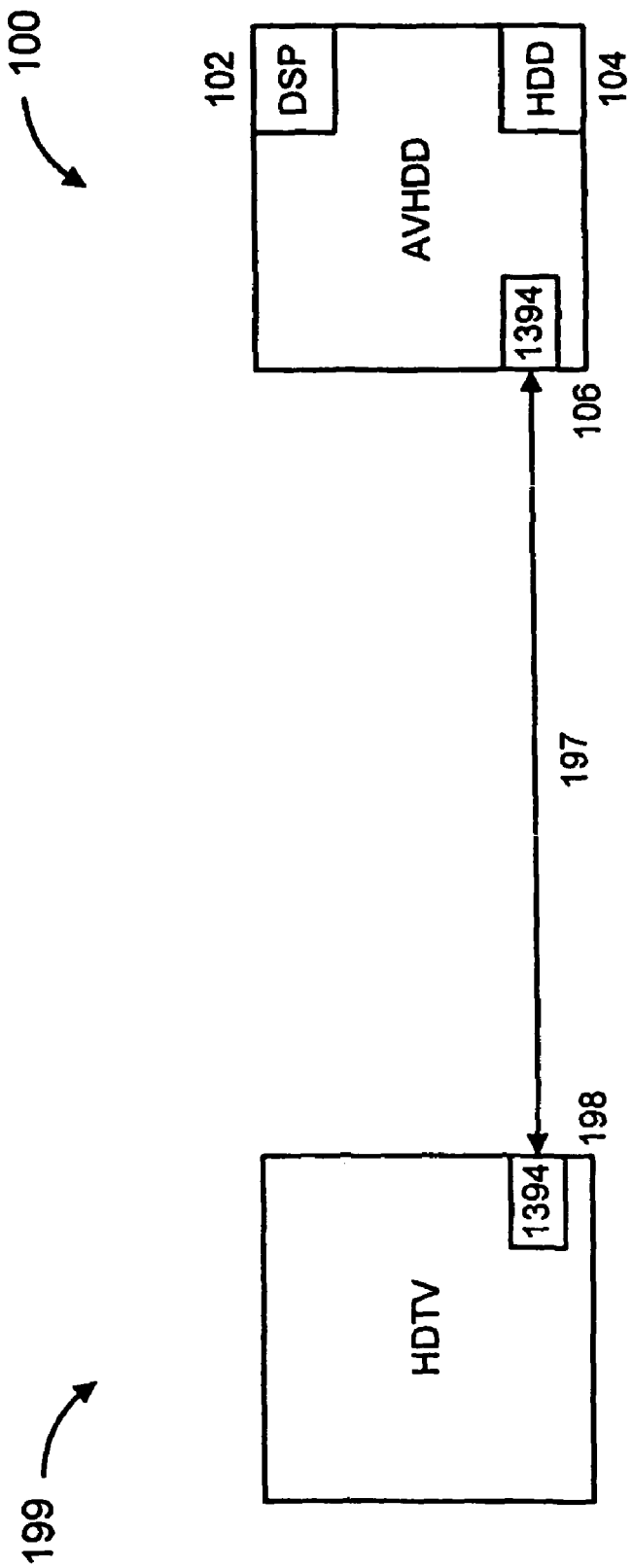
FIG. 1 is a block diagram illustrating an Audio Video Hard Disk Drive (AVHDD) 100 to which the present invention may be applied, according to an illustrative embodiment of the present invention.

FIG. 1 is a block diagram illustrating an Audio Video Hard Disk Drive (AVHDD) 100 as a storage device to which the present invention may be applied, according to an illustrative embodiment of the present invention. The AVHDD 100 includes a digital signal processor (DSP) 102, a Hard Disk Drive (HDD) 104, and at least one IEEE 1394 connector 106. The DSP 102 is for processing audio and video signals, and may be used to down-sample media as described further herein below.

The AVHDD 100 is coupled to a High Definition Television (HDTV) 199, as a display device, which has at least one IEEE 1394 connector 198. The IEEE 1394 connector 198 of the HDTV 199 is coupled to the IEEE 1394 connector 106 of the AVHDD 100. Video and audio signals to be recorded on the AVHDD 100, as well as control commands corresponding to the present invention, are provided to the AVHDD 100 from the HDTV 199 via the IEEE 1394 connectors 106 and 108 and corresponding cable 107. The HDTV 100 receives the video and audio signals as well as program data from an external source (not shown) that is coupled to other inputs (not shown) of the HDTV 100. The other inputs may be, for example, component video inputs, Super-video (S-video) inputs, composite video RCA jacks, and so forth. It is to be appreciated that while FIG. 1 is shown and described with respect to an HDTV, various aspects of the present invention may be implemented with respect to a standard television (i.e., non-HDTV) while maintaining the spirit and scope of the present invention.

The commands from the TV remote to the AVHDD are "translated" into Audio-Video Control (AV/C) commands and forwarded along via the 1394 connection between the TV and AVHDD. The AV/C specifications are released by the 1394 Trade Association. The suite of AV/C documentation is separated into a general AV/C specification document (AV/C Digital Interface Command Set General Specification, 1998, hereinafter "AVC 98a") and separate documents for each type of subunit (VCR, Tuner, Disc, etc.). The general specification (AVC 98a) defines a set of commands for controlling audio/video devices using IEEE 1394. The general specification (AVC 98a) is based on the function control protocol (FCP) defined in IEC61883-1, Consumer Electronic Audio/Video Equipment Digital Interface (1998-02 (hereinafter "IEC61883-1"). AVC 98a and IEC61883-1 are incorporated by reference herein in their entireties.

According to one embodiment of the present invention, Audio-Video/Control (AV/C) protocol may be used to send commands between the AVHDD and the HDTV so that when the user presses RECORD, the HDTV displays an alert panel that says:

RECORDING to digital recording device.

[Remaining Recording Space: X (xx %) of Y GB]

Y is the total number of Gigabytes that the AVHDD can store, X is the number of Gigabytes remaining, and xx % is the percentage of remaining space on the AVHDD with respect to the total storage space of the AVHDD. As one example, an AV/C command may be issued from a specially programmed remote (having its own programmable memory) belonging to the HDTV to obtain the preceding alert panel. The remaining recording space (X) or remaining percentage (xx %) may then be determined via a query or other processing directed to the AVHDD via the remote. This and other approaches to obtaining the preceding alert panel may be implemented in accordance with the present invention while maintaining the spirit thereof, given the teachings of the present invention provided herein.

The preceding alert panel provides the user with some situational awareness so that the user knows whether the program he/she just started recording will have enough room to fit on the AVHDD. If the program cannot fit, the user can stop the recording, delete some content so that a new recording will fit, and then restart recording. Alternatively, if the program cannot fit, the user could keep the recording going while deleting enough content to allow the current recording to fit onto the AVHDD.

According to another embodiment of the present invention, a program guide is available with the available programming selections displayed on different channels, (broadcast, on-demand, and so forth). The program guide includes a grid identifying the programming selections in one axis, and the time of the broadcast on a second axis. This information may be used to control devices operable through an IEEE-1394 interface or other device-controlling interface.

A user is able to select what programming to record by using a remote control to scroll across different selections by using arrow keys or other input mechanism that is capable of moving along the grid. The electronic programming guide indicates how much time is left for recording a specific selection by showing the programming selections in two different colors. If a selection were shown in green, the device would be able to record that program because a sufficient amount of recording space remains on the hard drive. If a selection is shown in red, the hard drive does not have enough space to record that selection.

According to one embodiment of the present invention, the TV determines that enough space is available on the hard drive of the AVHDD because the AVHDD records at a constant bitrate (regardless of whether the program is in high definition or in standard definition) and the space required for a program is derived from the program's duration (e.g., 1 hr=1 GB). Since different programs and signal formats require a different recording bitrate (e.g., ATSC, 256QAM, 64QAM, etc.) onto the AVHDD, the signal format of the program would have to be provided in and extracted from the EPG information about that program and used to algorithmically determine whether that program can fit onto the AVHDD.

If a user selects a programming choice in red, the programming guide will ask the user to delete selections, in the order that such selections were recorded. The selection may be deleted, for example, using First In, First Out (FIFO), Last In, First Out (LIFO), and so forth.

The present invention also provides an option of further showing programming selections in a third color, such as yellow, where a programming selection may be recorded, but at a lower quality. For example, the programming guide shows three program selections, three half-hour sitcoms.

The first programming choice is shown in green corresponding to a selection transmitted in standard definition television.

The second programming choice is shown in yellow, which indicates that the selection maybe recorded, but at a lower definition. In this case, the show is broadcasted in both high definition and standard definition, and the recording device will record the show at the lower definition.

The third programming choice is shown in red, which indicates that the selection may not be recorded. In this case, the selection is only transmitted in high definition. Optionally, the recording device may down-sample the transmission, based on the options provided to the user.

Other options may be used to save recording space for the hard drive, or recording device, using the principles of the present invention. For example, aspects of audio, video, and/or ancillary data may be modified to allow a program that otherwise could not be recorded in its entirety to be fully recorded. Such aspects may include, but are not limited to, additional subchannels or "minor" channels of a multicast, additional audio tracks (e.g., alternate languages for a program), closed captioning (e.g., primary and/or additional closed captioning "services"), electronic program guide data about the program, non-program related data. It should be noted that some HDTVs, e.g., the DM2CR mentioned above, allow users to set a menu default for whether they wanted to record all of a digital channel's subchannels (e.g., 8-1, 8-2, 8-3, and 8-4) or just the currently-tuned subchannel (e.g., 8-3).

Figure 2:
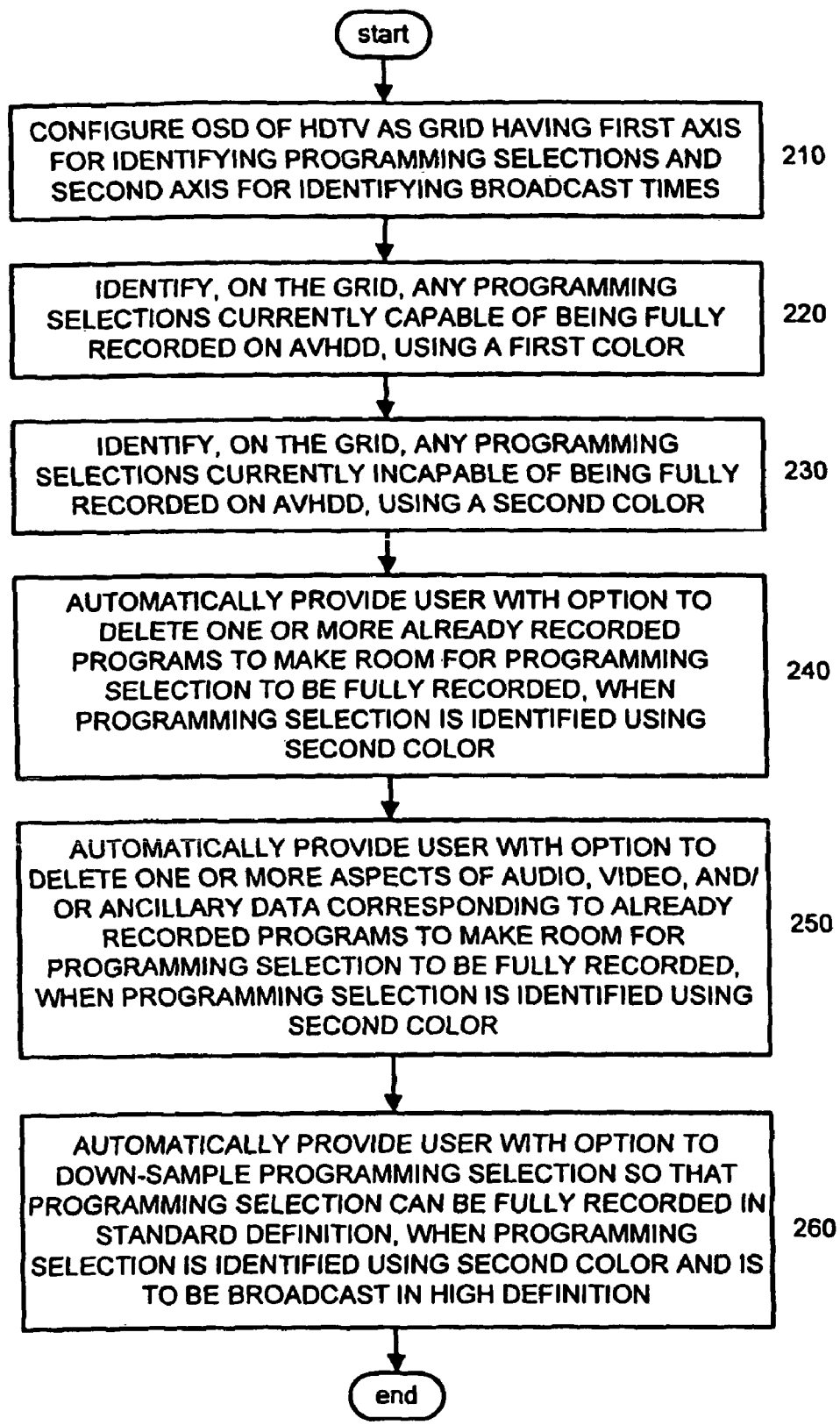
FIG. 2 is a flow diagram illustrating a method for indicating whether a program is capable of being fully recorded in a remaining storage space on an Audio Video Hard Disk Drive (AVHDD) that is without an On-Screen Display (OSD) and that is coupled to a High Definition Television (HDTV) that has an OSD, according to an illustrative embodiment of the present invention.

FIG. 2 is a flow diagram illustrating a method for indicating whether a program is capable of being fully recorded in a remaining storage space on an Audio Video Hard Disk Drive (AVHDD) that is without an On-Screen Display (OSD) and that is coupled to a High Definition Television (HDTV), as a display device, that has an OSD, according to an illustrative embodiment of the present invention.

The OSD of the HDTV is configured as a grid having a first axis and a second axis substantially perpendicular to the first axis (step 210). The first axis is for identifying the programming selections and the second axis is for identifying the respective broadcast times of the programming selections.

Any of the programming selections currently capable of being fully recording in the remaining storage space on the AVHDD are identified on the grid using a first color (step 220). Any of the programming selections that are currently incapable of being fully recording in the remaining storage space on the AVHDD are identified on the grid using a second color (step 230).

A user is automatically provided with an option to delete one or more already recorded programs from the AVHDD to make room for a given programming selection to be fully recorded in the remaining space on the AVHDD, when the given programming selection is identified on the grid by the second color as being currently incapable of being fully recorded in the remaining storage space (step 240). Step 240 may involve providing the option to delete the one or more already recorded programs from the AVHDD in the order in which the one or more already recorded programs were recorded on the AVHDD. For example, the user may be provided with the option to delete with respect to First In, First Out (FIFO), Last In, First Out (LIFO), individually by program name, and so forth. The option can either be implemented via a menu default which is set up in the TV's menu when the device is first installed or a "dialog box" which appears when the user attempts to record the program.

Moreover, the user is automatically provided with an option to delete one or more aspects of audio, video, and/or ancillary data corresponding to already recorded programs from the AVHDD to make room for a given programming selection to be fully recorded in the remaining space on the AVHDD, when the given programming selection is identified on the grid by the second color as being currently incapable of being fully recorded in the remaining storage space (step 250).

Further, the user is automatically provided with an option to down-sample a given programming selection so that the given programming selection can be fully recorded in the remaining storage space on the AVHDD in standard definition, when the given programming selection is identified on the grid by the second color as being currently incapable of being fully recorded in the remaining storage space and the given programming selection is to be broadcast in high definition (step 260).

Figure 3:
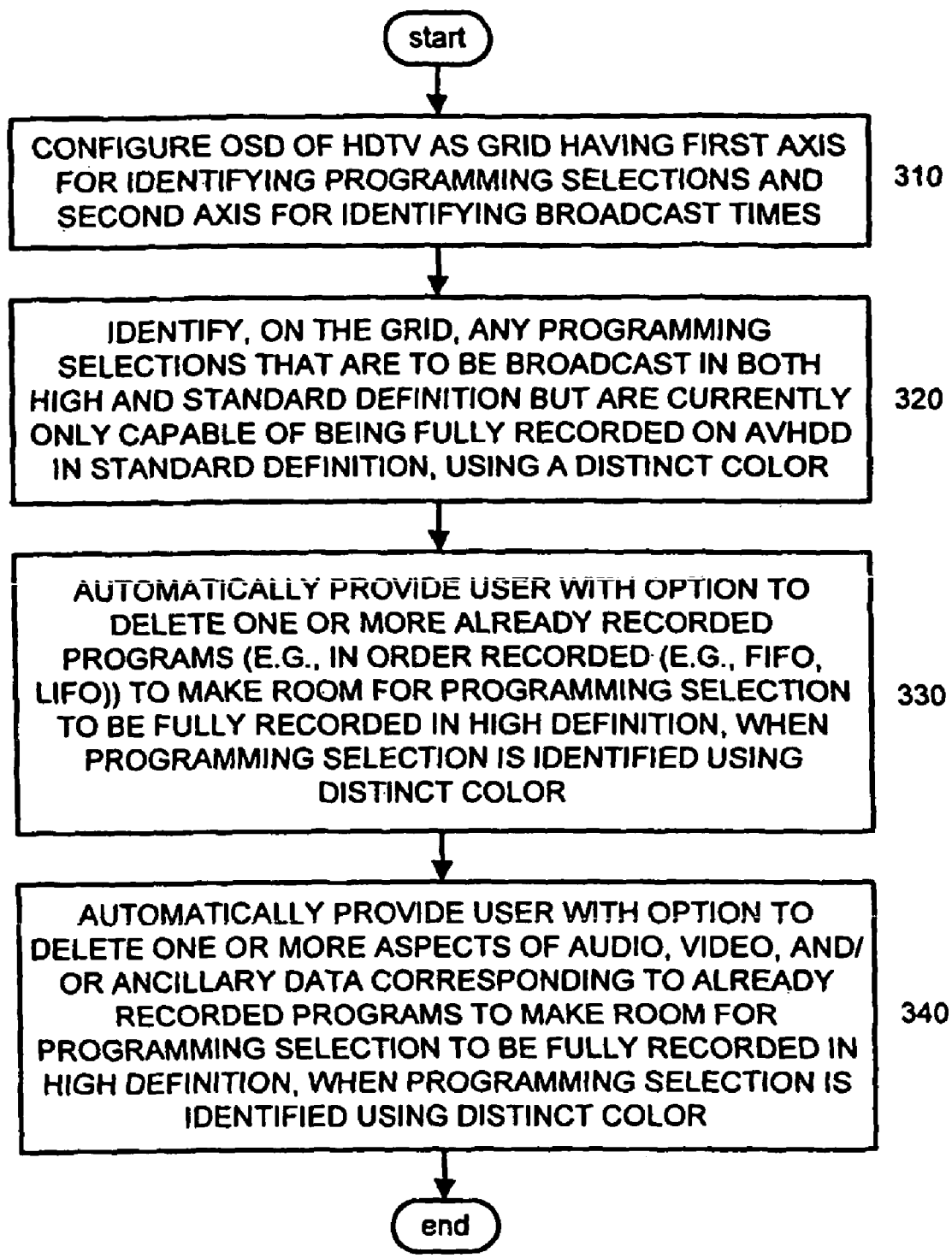
FIG. 3 is a flow diagram illustrating another method for indicating whether a program is capable of being fully recorded in a remaining storage space on an Audio Video Hard Disk Drive (AVHDD) that is without an On-Screen Display (OSD) and that is coupled to a High Definition Television (HDTV) that has an OSD, according to another illustrative embodiment of the present invention.

FIG. 3 is a flow diagram illustrating another method for indicating whether a program is capable of being fully recorded in a remaining storage space on an Audio Video Hard Disk Drive (AVHDD) that is without an On-Screen Display (OSD) and that is coupled to a High Definition Television (HDTV) that has an OSD, according to another illustrative embodiment of the present invention.

The OSD of the HDTV is configured as a grid having a first axis and a second axis substantially perpendicular to the first axis (step 310). The first axis is for identifying the programming selections and the second axis is for identifying the respective broadcast times of the programming selections.

Any of the programming selections that are to be broadcast in both high definition and standard definition but are currently only capable of being fully recorded in the remaining storage space on the AVHDD in standard definition are identified in a distinct color on the grid to indicate such capability (step 320).

It is to be appreciated that step 320 may be directed to the case where a digital channel is digitally broadcasting a program in both high definition and standard definition and where each version appears on a different subchannel (e.g., high definition on channel 8-1 and standard definition on channel 8-2). It might also refer to a broadcaster who is broadcasting the same program, but the high definition version is being broadcast digitally on 8-1, whereas the analog version is being broadcast in analog.

A user is automatically provided with an option to delete one or more already recorded programs from the AVHDD to make room for a given programming selection to be fully recorded in the high definition, when the given programming selection is identified on the grid in the distinct color as currently only being capable of being fully recorded in the standard definition (step 330). Step 330 may involve providing the option to delete the one or more already recorded programs from the AVHDD in the order in which the one or more already recorded programs were recorded on the AVHDD. For example, the user may be provided with the option to delete with respect to First In, First Out (FIFO), Last In, First Out (LIFO), and so forth.

Moreover, the user is automatically provided with an option to delete at least one aspect of at least one of audio, video, and ancillary data corresponding to already recorded programs from the AVHDD to make room for a given programming selection to be fully recorded in the remaining space on the AVHDD in high definition, when the given programming selection is identified on the grid in the distinct color as currently only being capable of being fully recorded in the standard definition (step 340).

It is to be appreciated that the methods of FIGS. 2 and 3 can be practiced together, while maintaining the spirit of the present invention. For example, in the case that both methods are used together, the distinct color described with respect to step 320 of FIG. 3 is a third color different from the first and second color described with respect to FIG. 2. In this way, not only can programs that can be fully recorded be identified along with programs that cannot be fully recorded in the remaining space on the AVHDD, but also programs that can be fully recorded in standard definition but not in high definition may also be identified in the case when a particular program is to be broadcast in both high definition and standard definition.

Moreover, one of ordinary skill in the art can appreciate that the fact of whether a program can fit onto the storage device can be indicated using any distinctive visual identifier other than color. For example, such visual identifiers may include, but are not limited to, an icon which appears in the program "cell" or "grid" itself or only appears somewhere in the EPG when the program is highlighted, the shape of the program cell (e.g., the cell consists of broken lines instead of solid lines), the text of the program name being in a different size or font type or accented in some way (e.g., bold, underline, italics), or other visually distinctive trait of the program cell or EPG. That is, given the teachings of the present invention provided herein, one of ordinary skill in the related art will contemplate these and various other ways in which to indicate whether a program can fit onto an AVHDD, while maintaining the spirit of the present invention.

It is also to be appreciated that the AVHDD, TV, any display device, or any storage device may have an OSD capable of generating the grid described above. The grid would display which programs could be recorded on a storage device in a variety of recording formats such as high definition, standard definition, and other formats used for recording television programming. It is also contemplated that a storage device and a display device may be combined into a single unit, where the unit operates in accordance with the principles of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for indicating whether a program is capable of being fully recorded in a remaining storage space on storage device for a display device comprising the steps of:
   configuring an On Screen Display (OSD) as a grid having a first axis and a second axis, the first axis for identifying programming selections and the second axis for identifying respective broadcast times of the programming selections,
   wherein any of the programming selections currently capable of being fully recorded in the remaining storage space on the storage device are identified on the grid using a first distinctive visual identifier, and any of the programming selections that are currently incapable of being fully recorded in the remaining storage space on the storage device are identified on the grid using a second distinctive visual identifier, wherein the display device is a High Definition Television (HDTV), and
   any of the programming selections that are to be broadcast in both high definition and standard definition but currently only capable of being fully recorded in the remaining storage space on the storage device in the standard definition are identified in a third distinctive visual identifier on the grid,
   wherein the method further comprises the step of automatically providing a user with an option to delete at least one aspect of at least one of audio, video, and ancillary data corresponding to already recorded programs from the storage device to make room for a given programming selection to be fully recorded in the remaining space on the storage device in the high definition, when the given programming selection is identified on the grid by the third distinctive visual identifier as being currently only capable of being fully recorded in the remaining storage space in the standard definition.

2. The method of claim 1, further comprising the step of automatically providing a user with an option to delete one or more already recorded programs from the storage device to make room for a given programming selection to be fully recorded in the remaining space on the storage device in the high definition, when the given programming selection is identified on the grid by the third distinctive visual identifier as being currently only capable of being fully recorded in the remaining storage space in the standard definition.

3. The method of claim 2, wherein said providing step provides the option to delete the one or more already recorded programs from the storage device in an order in which the one or more already recorded programs were recorded on the storage device.

4. The method of claim 3, wherein the order is one of First In, First Out (FIFO) and Last In, First Out (LIFO).

5. The method of claim 1, wherein the third visual identifier comprises at least one of a distinctive color, a distinctive icon, a distinctive shape, a distinctive text size, a distinctive text font, and a distinctive text highlight.

* * * * *